United States Patent
Huang et al.

(10) Patent No.: US 10,114,500 B2
(45) Date of Patent: Oct. 30, 2018

(54) DRIVING UNIT WITHOUT A RESET TRANSISTOR FOR A TOUCH DRIVING ELECTRODE AND DRIVING METHOD THEREOF

(71) Applicants: BOE TECHNOLOGY GROUP CO., LTD., Beijing (CN); ORDOS YUANSHENG OPTOELECTRONICS CO., LTD., Ordos (CN)

(72) Inventors: Fei Huang, Beijing (CN); Jian Sun, Beijing (CN); Cheng Li, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 83 days.

(21) Appl. No.: 15/111,142

(22) PCT Filed: Dec. 24, 2015

(86) PCT No.: PCT/CN2015/098719
§ 371 (c)(1),
(2) Date: Jul. 12, 2016

(87) PCT Pub. No.: WO2017/020506
PCT Pub. Date: Feb. 9, 2017

(65) Prior Publication Data
US 2017/0249042 A1 Aug. 31, 2017

(30) Foreign Application Priority Data
Aug. 4, 2015 (CN) .......................... 2015 1 0471601

(51) Int. Cl.
*G06F 3/041* (2006.01)

(52) U.S. Cl.
CPC .................................. *G06F 3/0416* (2013.01)

(58) Field of Classification Search
CPC ...................................................... G06F 3/0416
See application file for complete search history.

(56) References Cited

U.S. PATENT DOCUMENTS

2008/0285705 A1* 11/2008 Wei ........................ G09G 3/006
377/78
2009/0304138 A1* 12/2009 Tsai ........................ G11C 19/28
377/79

(Continued)

FOREIGN PATENT DOCUMENTS

| CN | 103823589 A | 5/2014 |
| CN | 104537972 A | 4/2015 |

(Continued)

OTHER PUBLICATIONS

Written Opinion of the International Searching Authority and International Search Report for International Application No. PCT/CN2015/098719, dated Apr. 27, 2016. Translation provided by Dragon Intellectual Property Law Firm.

*Primary Examiner* — William Boddie
*Assistant Examiner* — Andrew Schnirel
(74) *Attorney, Agent, or Firm* — Harness, Dickey & Pierce, P.L.C.

(57) ABSTRACT

The present disclosure provides a driving unit, a driving method and a driving circuit of a touch driving electrode and a touch display panel. The driving unit of the touch driving electrode includes a start signal shift sub-unit, configured to control a start signal output terminal to output a first level during an adjacent time period next to a time period in which a potential of the start signal is the first level, then reset the start control signal so as to control the start control signal output terminal output the second level, and control the touch driving signal output terminal to output a touch (Continued)

scanning signal when the potential of the start control signal and the potential of the touch control signal are both the first level. The first clock signal has a phase opposite to that of the second clock signal.

18 Claims, 4 Drawing Sheets

(56) References Cited

U.S. PATENT DOCUMENTS

| | | | | |
|---|---|---|---|---|
| 2010/0201668 A1* | 8/2010 | Ko | ........................ | G09G 3/3677 |
| | | | | 345/211 |
| 2010/0214279 A1* | 8/2010 | Kim | ........................ | G09G 3/344 |
| | | | | 345/213 |
| 2011/0007863 A1* | 1/2011 | Tsai | ........................ | G11C 19/28 |
| | | | | 377/79 |
| 2014/0064438 A1* | 3/2014 | Wu | ........................ | G09G 3/3266 |
| | | | | 377/64 |
| 2014/0355732 A1* | 12/2014 | Lin | ......................... | G06F 3/041 |
| | | | | 377/64 |
| 2015/0187302 A1* | 7/2015 | Dai | ........................ | G09G 3/006 |
| | | | | 345/92 |
| 2015/0277651 A1* | 10/2015 | Zhang | ..................... | G06F 3/041 |
| | | | | 345/173 |
| 2017/0186773 A1* | 6/2017 | Fan | ........................ | H01L 27/124 |

FOREIGN PATENT DOCUMENTS

| | | |
|---|---|---|
| CN | 104793805 A | 7/2015 |
| CN | 105159488 A | 12/2015 |
| KR | 20150073466 A | 7/2015 |

* cited by examiner

DRIVING UNIT WITHOUT A RESET TRANSISTOR FOR A TOUCH DRIVING ELECTRODE AND DRIVING METHOD THEREOF

CROSS-REFERENCE TO RELATED APPLICATIONS

The present application is the U.S. national phase of PCT Application No. PCT/CN2015/098719 filed on Dec. 24, 2015, which claims a priority of the Chinese patent application No. 201510471601.5 filed on Aug. 4, 2015, which are incorporated herein by reference in their entirety.

TECHNICAL FIELD

The present disclosure relates to the field of touch display technology, in particular to a driving unit, a driving method and a driving circuit of a touch driving electrode, and a touch display panel.

BACKGROUND

With the development of the mobile display device, a touch sensing mode has been applied to human-machine interaction by replacing a conventional mechanical key mode. A driving electrode in the touch driving circuit plays an important role. In a conventional driving unit of the touch driving electrode, a reset transistor needs to be added so that the cost and power consumption are increased. Furthermore, a gate electrode of the reset transistor in the driving unit of the touch driving electrode is connected to a touch driving signal output terminal of the next stage of driving unit, so that driving circuit of the touch driving electrode when connected in a cascade manner is complicated.

SUMMARY

An object of the present disclosure is to provide a driving unit, driving method, driving circuit of a touch driving electrode and a touch display panel, so as to avoiding using a reset, so that the problems in the prior art, that more transistor is used and cost and power consumption is increased, and that the driving circuit of the touch driving electrode during connected in a cascade manner has a complicated structure due to the gate electrode of the reset transistor being connected to the touch driving signal output terminal of the next stage driving unit, are solved.

In one aspect, a driving unit of the a touch driving electrode is provided, it includes: a start signal shift sub-unit, connected to a start control signal output terminal, and configured to control the start control signal output terminal to output a first level under the control of a start signal, the first level, a second level, a first clock signal and a second clock signal during an adjacent time period next to a time period in which a potential of the start signal is the first level, then reset the start control signal so as to control the start control signal output terminal to output the second level; and a touch driving signal output sub-unit, connected to a touch driving signal output terminal, a touch signal input terminal, a touch scanning input terminal and the start control signal output terminal, and configured to control the touch driving signal output terminal to output a touch scanning signal under the control of the start control signal when a potential of the start control signal and a potential of the touch control signal are both the first level, wherein a phase of the first clock signal is opposite to that of the second clock signal.

During implementation, the start signal shift sub-unit includes: an input module, connected to the first start control node, and configured to receive the first level and the start signal, and control the first level to be input to the first start control node when the potential of the start signal is the first level; a first start control node potential maintenance module, connected between the first start control node and the start control signal output terminal, and configured to keep the potential of first start control node to be the first level during the adjacent time period next to the time period in which the potential of the start signal is the first level; a second start control node potential control module, configured to receive the start signal, the first clock signal, the first level and the second level respectively, and connected to the second start control node and the start control signal output terminal, and configured to control the potential of the second start control node to be the first level when the potential of the first clock signal is the first level and control the potential of the second start control node to be the second level when the potential of the start signal is the first level or the start control signal output terminal outputs the first level; a start control signal output module, connected to the first start control node and the start control signal output terminal, configured to receive the second clock signal, and control the start control signal output terminal output the second clock signal when the potential of the first start control node is the first level; a first start control node reset module, connected to the first control node and the second start control node, configured to receive the second level, and control the potential of the first start control node to be the second level when the potential of the second start control node is the first level; and a start control signal reset module, connected to the second start control node and the start control signal output terminal, configured to receive the second level, and control the start control signal output terminal to output the second level when the potential of the second start control node is the first level.

During implementation, the touch driving signal output sub-unit is further configured to control the touch driving signal output terminal to output a common electrode voltage signal under the control of the start control signal, the first level, the second level and the first clock signal when the potential of the start control signal and the potential of the touch control signal are not the first level at the same time.

During implementation, the touch driving signal output sub-unit includes: a first touch node control module, connected to the start control signal output terminal and the first touch node, and configured to receive the touch control signal, control the first touch node to receive the touch control signal when the start control signal output terminal outputs the first level; and a touch driving signal output module, connected to the first touch node and the touch driving signal output terminal, configured to receive the touch scanning signal, and control the touch driving signal output terminal to output the touch scanning signal when the potential of the first touch node is the first level.

During implementation, the touch driving signal output sub-unit is further includes: a second touch node control module, configured to receive the touch control signal, the first level and the second level, and be connected to the second touch node, control the second touch node to receive the second level when the potential of the touch control signal is the first level, and control the second touch node to receive the first level when the potential of the touch control signal is not the first level; a touch driving signal reset module, connected to the second touch node and the touch driving signal output terminal, and configured to receive the common electrode voltage signal, control the touch driving signal output terminal to output the common electrode voltage signal when the potential of the second touch node is the first level.

During implementation, the touch driving signal output sub-unit further includes a touch node potential control module, configured to receive the first clock signal and the first level respectively, connected to the second touch node, and control the second touch node to receive the first level when the potential of the first clock signal is the first level.

During implementation, the input module includes an input transistor, a gate electrode of the input transistor receiving the start signal, the first electrode of the input transistor receiving the first level, and the second electrode of the input transistor being connected to the first start control node, the first start control node potential maintenance module includes a first capacitor.

During implementation, the driving unit of the touch driving electrode further includes an external control transistor, a gate electrode of the external control transistor receiving an external control signal, a first electrode of the external control transistor receiving the start signal and a second electrode of the external control transistor being connected to the gate electrode of the input transistor, a potential of the external control signal is the first level.

During implementation, the second start control node potential control module includes: a first control transistor, a gate electrode of the first control transistor receiving the first level, a first electrode of the first control transistor receiving the first clock signal; a second control transistor, a gate electrode of the second control transistor being connected to a second electrode of the first control transistor, a first electrode of the second control transistor receiving the first level, a second electrode of the second control transistor being connected to the second start control node; a third control transistor, a gate electrode of the third control transistor receiving the start signal, a first electrode of the third control transistor being connected to the second start control node and a second electrode of the third control transistor receiving the second level; and a fourth control transistor, a gate electrode of the fourth control transistor being connected to the start control signal output terminal, a first electrode of fourth control transistor being connected to the second start control node and a second electrode of the fourth control transistor receiving the second level.

During implementation, the start control signal output module includes a start control signal output transistor, a gate electrode thereof is connected to the first start control node, a first electrode thereof receives the second clock signal and a second electrode thereof is connected to the start control signal output terminal.

During implementation, the driving unit of the touch driving electrode further includes a first single tube transmission gate connected between the second electrode of the input transistor and the first start control node, wherein the first single tube transmission gate includes a first transmission transistor, a gate electrode of which receives the first level, a first electrode of which is connected to the second electrode of the input transistor, and a second electrode of which is connected to the first start control node.

During implementation, the first start control node reset module includes a first start control node reset transistor, a gate electrode of which is connected to the second start control node, a first electrode of which is connected to the first start control node, and a second electrode of which receives the second level.

During implementation, the start control signal reset module includes a start control signal reset transistor, a gate electrode of which is connected to the second start control node, a first electrode of which is connected to the start control signal output terminal, and a second electrode of which receives the second level.

During implementation, the driving unit of the touch driving electrode further includes a second capacitor, one end of which being connected to the second start control node and the other end of which receiving the second level.

During implementation, the touch driving signal output module includes a touch driving signal output transistor, a gate electrode of which being connected to the first touch node, a first electrode of which receiving the touch scanning signal, and a second electrode of which being connected to the touch driving signal output terminal; and the first touch node control module includes a first touch node control transistor, a gate electrode of which being connected to the start control signal output terminal, a first electrode of which being connected to the touch control signal, and a second electrode of which being connected to the first touch node.

During implementation, the driving unit of the touch driving electrode further includes a third capacitor connected between the gate electrode of the touch driving signal output transistor and the touch driving signal output terminal.

During implementation, the driving unit of the touch driving electrode further includes a second single tube transmission gate connected between the second end of the first touch node control transistor and the first touch node, wherein the second single tube transmission gate includes a second transmission transistor, a gate electrode of which receives the first level, a first electrode of which is connected to the first touch transistor, and a second electrode of which is connected to the second electrode of the first control node control transistor.

During implementation, the second touch node control module includes: a fifth control transistor, a gate electrode of the fifth control transistor receiving the first level, a first electrode thereof receiving the first level, and a second electrode thereof being connected to the second touch node; and a sixth control transistor, a gate electrode of the sixth transistor being connected to the second electrode of the first touch node control transistor, a first electrode thereof being connected to the second touch node and the second electrode thereof receiving the second level.

During implementation, the driving unit of the touch driving electrode further includes a third single tube transmission gate connected between the second end of the first touch node control transistor and the gate electrode of the sixth control transistor, wherein the third single tube transmission gate includes a third transmission transistor, a gate electrode of which receives the first level, a first electrode of which is connected to the second electrode of the first touch node control transistor, and a second electrode of which is connected to the gate electrode of the sixth control transistor.

During implementation, the touch driving signal reset module includes a touch driving signal reset transistor, a gate electrode of which is connected to the second touch node, a first electrode thereof is connected to the touch driving signal output terminal, a second electrode of which is connected to the common electrode voltage signal.

During implementation, the driving unit of the touch driving electrode further includes a fourth single tube transmission gate connected between the first electrode of the sixth control transistor and the gate electrode of the touch driving signal reset transistor, wherein the fourth single tube transmission gate includes a fourth transmission transistor, a gate electrode of which receives the first level, a first electrode of which is connected to the second touch node, and a second electrode of which is connected to the first electrode of the sixth control transistor.

During implementation, the driving unit of the touch driving electrode further includes a fourth capacitor, one end of which being connected to the gate electrode of the touch driving signal reset transistor and the other end of which receiving the second level.

During implementation, the touch node potential control module includes: a seventh transistor, a gate electrode of the seventh transistor receiving the first level, a first electrode thereof receiving the first clock signal; and an eighth transistor, a gate electrode of the eighth transistor being connected to the second electrode of the seventh control transistor, a first electrode thereof receives the first level, and a second electrode thereof is connected to the second touch node.

During implementation, the input transistor, the start control signal input transistor, the first start control node reset transistor, the start control signal reset transistor, the touch driving signal output transistor, the first touch node control transistor, the touch driving signal reset transistor, the first control transistor, the second control transistor, the third control transistor, the fourth control transistor, the fifth control transistor, the sixth control transistor, the seventh control transistor, and the eighth control transistor are all NMOS transistors.

In another aspect, a driving method of a touch driving electrode used to drive a driving unit of the touch driving electrode is provided. The driving method includes: during a clock period which is right after a preset clock period during which a potential of a start signal is at a first level, a touch driving signal output sub-unit controlling a touch driving signal output terminal to output a touch scanning signal, under the control of a start signal, the first level, a second level, a first clock signal and a second clock signal, when the potential of the start control signal and the potential of the touch control signal are both at the first level; and during the clock period which is right after the preset clock period during which the potential of the start signal is at a first level, under the control of the start signal, the first level, the second level, the first clock signal and the second clock signal, the start signal shift sub-unit controlling the start control signal output terminal to output the first level, then resetting the start control signal to control the start control signal output terminal to output the second level.

In still another aspect, a driving circuit of a touch driving electrode including comprising multiple stages of driving units of the touch driving electrode is provided. Except for the first stage of driving unit, a start signal input terminal of each stage of driving unit is connected to the start control signal output terminal of a previous stage of the driving unit; first clock signals applied to adjacent stages of driving units have opposite phase; and second clock signals applied on adjacent stages of driving units have opposite phase.

In yet another aspect, a touch display panel including a driving circuit of a touch driving electrode is provided.

As compared with the existing technology, a reset transistor whose gate electrode being connected to an output terminal of the next stage of driving unit is deleted from the driving circuit of the present disclosure, so that the number of the transistors is reduced and the circuits connected in a cascade manner is simplified.

DETAILED DESCRIPTION

To illustrate the objects, technical solutions and advantages of the present disclosure more clearly, the technical solutions in the embodiments of the present disclosure will be described clearly and completely hereinafter in conjunction with the drawings in the embodiments of the present disclosure. Apparently, the described embodiments are only some but not all of the embodiments of the present disclosure. All the other embodiments obtained by those ordinary skilled in the art based on the embodiments of the present disclosure without creative effort fall within the scope of protection of the present disclosure.

Technical terms or scientific terms used herein should be interpreted to have the common meanings as understood by those skilled in the art, unless defined otherwise. Words such as "first" and "second" used in the specification and the claims of the disclosed patent application do not indicate any order, quantity or importance, but only to distinguish different components. Likewise, words such as "one" and "a" do not indicate any quantity limitation, but only represent presence of at least one. Words such as "connection" and "connected" are not limited to physical or mechanical connection, but may include electrical connection, direct or indirect. Words such as "above", "below", "left" and "right" are only used to indicate relative position relations, and the relative position relation changes as an absolute position of a description object changes.

Figure 1:
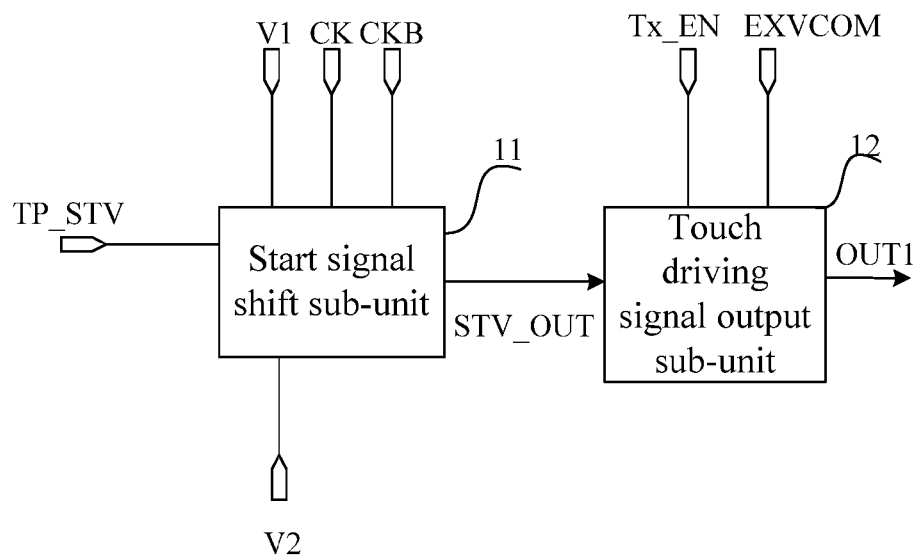
FIG. 1 is a structure block diagram showing a driving unit of a touch driving electrode according to some embodiments of the present disclosure.

As shown in FIG. 1, a driving unit of a touch driving electrode in an embodiment of the present disclosure includes a start signal shift sub-unit 11 and a touch driving signal output sub-unit 12. The start signal shift sub-unit 11 is connected to a start control signal output terminal STV_OUT, and used to control the start control signal output terminal STV_OUT to output a first level V1 under the control of a start signal TP_STV, the first level V1, a second level V2, a first clock signal CK and a second clock signal CKB during an adjacent time period next to a time period in which a potential of the start signal TP_STV is the first level V1, then reset the start control signal so as to control the start control signal output terminal STV_OUT output the second level V2. The touch driving signal output sub-unit 12 is connected to a touch driving signal output terminal OUT1, touch signal input terminal Tx_EN, touch scanning input terminal EXVCOM and the start control signal output terminal STV_OUT, and used to control the touch driving signal output terminal OUT1 output a touch scanning signal which is input by the touch scanning input terminal EXVCOM under the control of the start control signal when both the level of the start control signal and the level of the touch control signal are the first level V1. A phase of the first clock signal CK is opposite to that of the second clock signal CKB.

The driving unit of the touch driving electrode in some embodiments of the present disclosure needs not to use the reset transistor whose electrode is connected to the output terminal of the next stage driving unit compared with the prior art, so that the number of the transistor is reduced and the circuit structure is simple during connected in a cascade manner.

Figure 2:
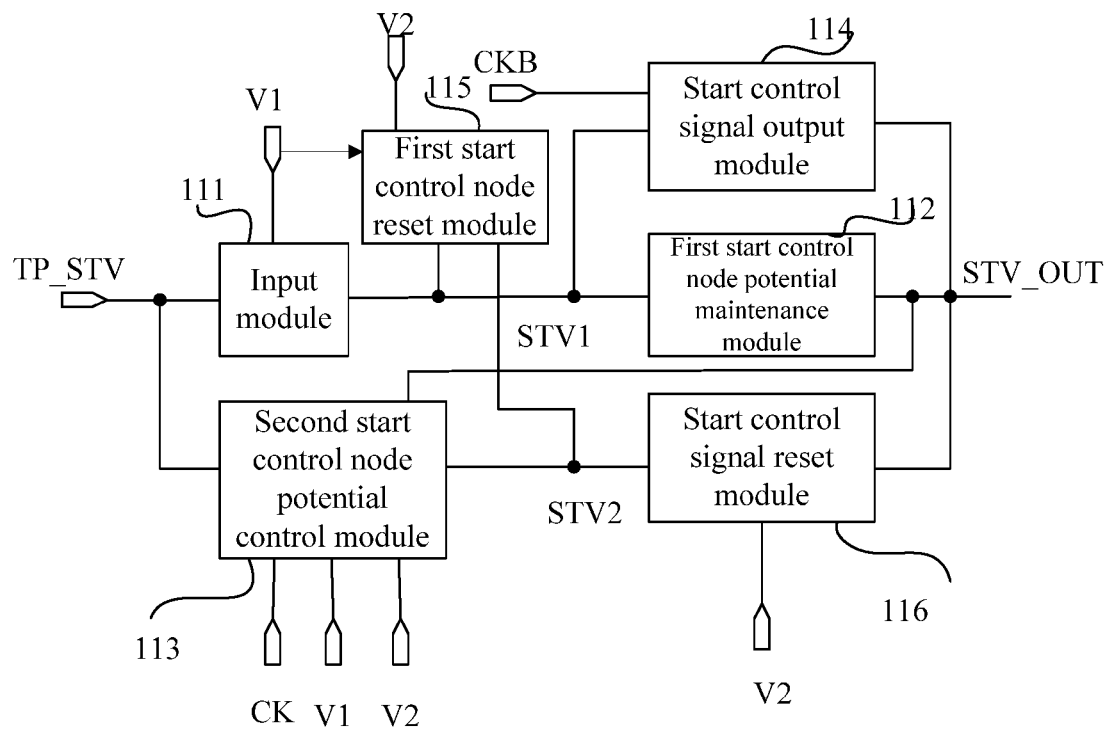
FIG. 2 is another structure block diagram showing a driving unit of the touch driving electrode according to some embodiments of the present disclosure.

As shown in FIG. 2, the start signal shift sub-unit 11 includes an input module 111, a first start control node potential maintenance module 112, a second start control node potential control module 113, a start control signal output module 114, a first start control node reset module 115 and a start control signal reset module 116.

The input module 111 is connected to the first start control node STV1, and receives the first level V1 and the start signal TP_STV, and configured to control the first level V1 being input to the first start control node STV1 when the level of the start signal TP_STV is the first level V1.

The first start control node potential maintenance module 112 is connected between the first start control node STV1 and the start control signal output terminal STV_OUT, and configured to keep the potential of first start control node STV to be the first level V1 during an adjacent time period next to a time period in which the potential of the start signal TP_STV is the first level V1.

The second start control node potential control module 113 receives the start signal TP_STV, the first clock signal CK, the first level V1 and the second level V1 respectively, and is connected to the second start control node STV 2 and the start control signal output terminal STV_OUT, and configured to control the potential of the second start control node STV 2 to be the first level V1 when the potential of the first clock signal CK is the first level V1 and control the potential of the second start control node STV2 to be the second level V2 when the potential of the start signal TP_STV is the first level V1 or the start control signal output terminal STV_OUT outputs the first level V1.

The start control signal output module 114 is connected to the first start control node STV 1 and the start control signal output terminal STV_OUT, receives the second clock signal CKB, and is configured to control the start control signal output terminal STV_OUT output the second clock signal CKB when the potential of the first start control node STV1 is the first level V1.

The first start control node reset module 115 is connected to the first control node STV1 and the second start control node STV 2, receives the second level V2, and is configured to control the potential of the first start control node STV1 to be the second level V2 when the potential of the second start control node STV2 is the first level V1.

The start control signal reset module 116 is connected to the second start control node STV2 and the start control signal output terminal STV_OUT, receives the second level V2, and is configured to control the start control signal output terminal STV_OUT to output the second level V2 when the potential of the second start control node STV2 is the first level V1.

In the driving unit of the touch driving electrode as shown in FIG. 2, the start signal shift sub-unit 11 includes the input module 111, the first start control node potential maintenance module 112, the second start control node potential control module 113, the start control signal output module 114, the first start control node reset module 115 and the start control signal reset module 116. The potentials of the first start control node STV1 and the second start control node STV2 are controlled based on the first level V1, the second level V2, the start signal TP_STV and the first clock signal CK, and the start control signal output terminal STV_OUT is controlled to output the second clock signal CKB when the potential of the first start control node STV1 is the first level V1, and the start control signal output terminal STV_OUT is controlled to output the second level V2 when the potential of the second start control node STV2 is the first level V1.

Figure 3:
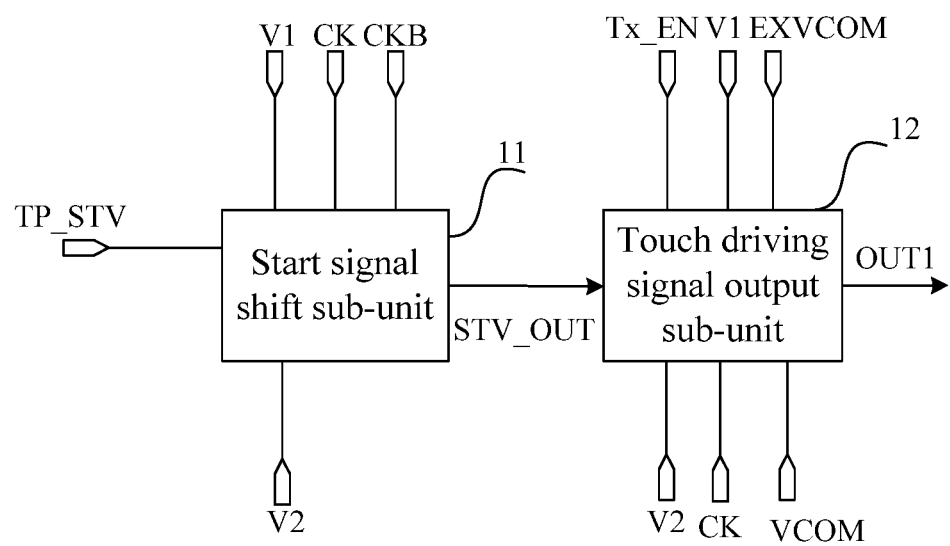
FIG. 3 is yet another structure block diagram showing a driving unit of the touch driving electrode according to some embodiments of the present disclosure.

As shown in FIG. 3, the touch driving signal output sub-unit 12 is further configured to control the touch driving signal output terminal OUT1 output a common electrode voltage signal VCOM under the control of the start control signal output from the start control signal output terminal STV_OUT, the first level V1, the second level V2 and the first clock signal CK in the condition that the start control signal output from the start control signal output terminal STV_OUT and the touch control signal output from the touch signal input terminal Tx_EN are not enabled at the same time (i.e. not the condition that both of them are the first level at the same time).

In the driving unit of the touch driving electrode as shown in FIG. 3, the touch driving signal output sub-unit further controls the touch driving signal output terminal OUT1 output the common electrode voltage signal VCOM when the touch driving signal output terminal OUT1 does not output the touch scanning signal.

Figure 4:
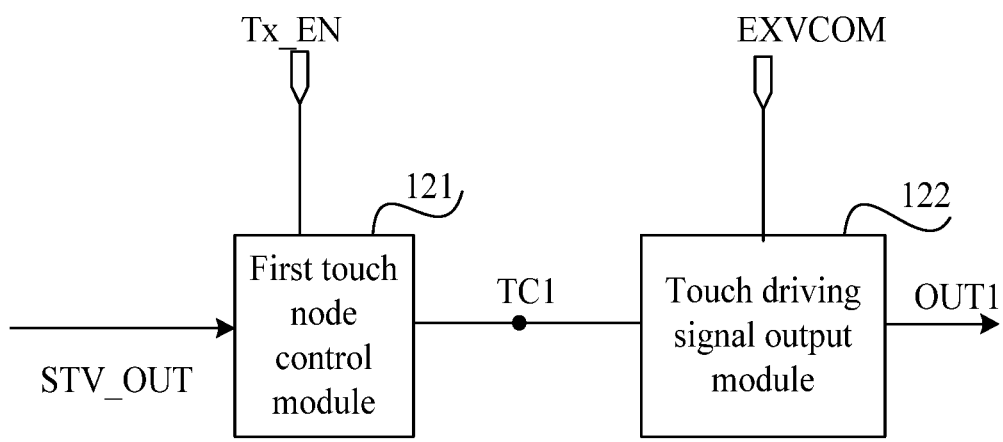
FIG. 4 is still yet another structure block diagram showing a driving unit of the touch driving electrode according to some embodiments of the present disclosure.

As shown in FIG. 4, the touch driving signal output sub-unit 12 includes a first touch node control module 121 and a touch driving signal output module 122.

The first touch node control module 121 is connected to the start control signal output terminal STV_OUT and the first touch node TC1, and receives the touch control signal input by the touch signal input terminal, is configured to control the first touch node TC1 to receive the touch control signal input by the touch signal input terminal Tx_EN when the start control signal output terminal STV_OUT outputs the first level V1.

The touch driving signal output module 122 is connected to the first touch node TC1 and the touch driving signal output terminal OUT1, receives the touch scanning signal input by the touch scanning input terminal EXVCOM, and is configured to control the touch driving signal output terminal OUT1 to output the touch scanning signal input by the touch scanning input terminal EXVCOM when the potential of the first touch node is the first level V1.

In the driving unit of the touch driving electrode as shown in FIG. 4, the touch driving signal output sub-unit 12 includes the first touch node control module 121 and the touch driving signal output module 122. The first touch node control module 121 controls the first touch node TC1 to receive the touch control signal when the start control signal output terminal STV_OUT outputs the first level V1. The touch driving signal output module 122 controls the touch driving signal output terminal OUT1 to output the touch scanning signal when the potential of the first control node TC1 is the first level V1.

Figure 5:
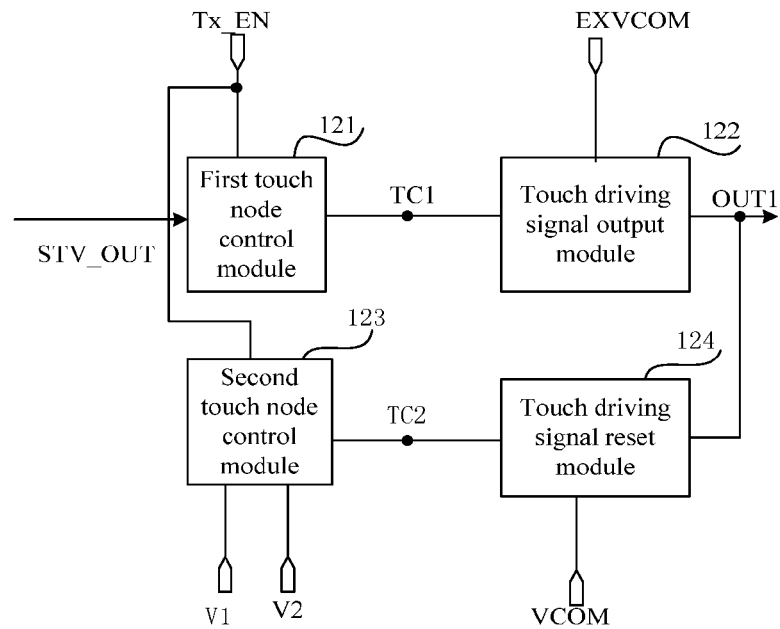
FIG. 5 is still yet another structure block diagram showing a driving unit of the touch driving electrode according to some embodiments of the present disclosure.

As shown in FIG. 5, the touch driving signal output sub-unit 12 further includes a second touch node control module 123 and a touch driving signal reset module 124. The second touch node control module 123 receives the touch control signal input by the touch signal input terminal Tx_EN, the first level V1 and the second level V2, is connected to the second touch node TC2, and is configured control the second node TC2 to receive the second level V2 when the potential of the touch control signal is the first level V1, and control the second touch node TC2 to receive the first level V1 when the potential of the touch control signal is not the first level V1. The touch driving signal reset module 124 is connected to the second touch control node TC2 and the touch driving signal output terminal OUT1, receives the common electrode voltage signal VCOM, and is configured to control the touch driving signal output terminal OUT1 to output the common electrode voltage signal VCOM when the potential of the second touch node TC2 is the first level V1.

In the driving unit of the touch driving electrode as shown in FIG. 5, the touch driving signal output sub-unit 12 is further includes the second touch node control module 123 and the touch driving signal reset module 124. The second touch node control module 123 controls the second touch node TC2 to receive the second level V2 when the potential of the touch control signal is the first level V1, and controls the second touch node TC2 to receive the first level V1 when the potential of the touch control signal is not the first level V1. The touch driving signal reset module 124 controls the touch driving signal output terminal OUT1 to output the common electrode voltage signal VCOM when the potential of the second touch node TC2 is the first level V1.

Figure 6:
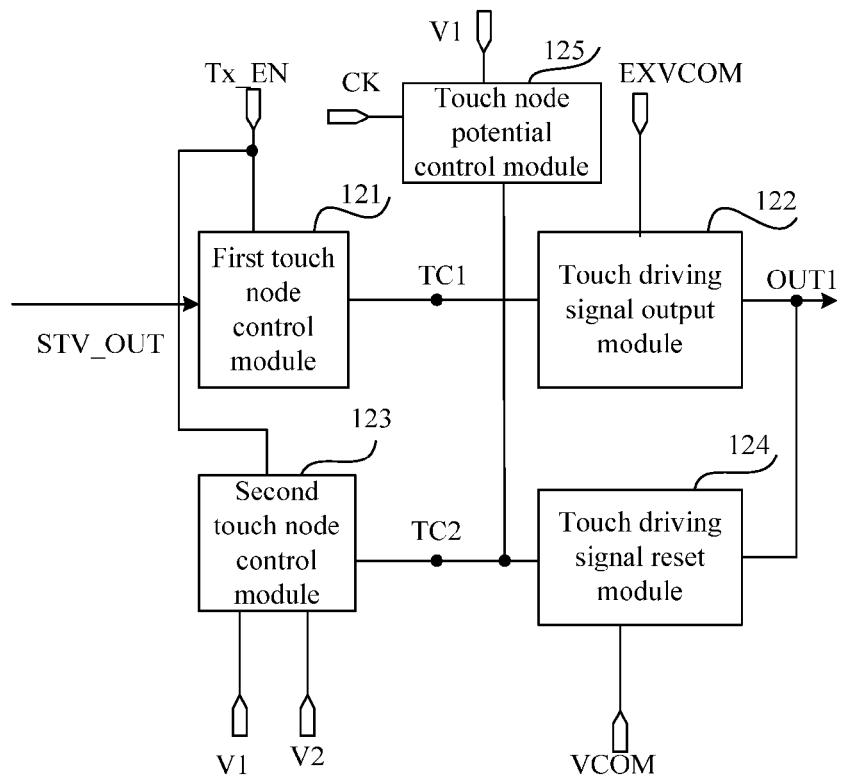
FIG. 6 is still yet another structure block diagram showing a driving unit of the touch driving electrode according to some embodiments of the present disclosure.

As shown in FIG. 6, the touch driving signal output sub-unit 12 further includes a touch node potential control module 125 which is receives the first clock signal CK and the first level V1 respectively, and is connected to the second touch node TC2, and is configured to control the second touch node TC2 to receive the first level V1 when the potential of the first clock signal CK is the first level V1.

Optionally, the input modules includes a input transistor. A gate electrode of the input transistor receives the start signal, the first electrode of the input transistor receives the first level, and the second electrode of the input transistor is connected to the first start control node. The first start control node potential maintenance module includes a first capacitor. The functionality of the first capacitor is voltage bootstrap and keeping the voltage during practice.

Transistors used in the embodiments of the present disclosure may be TFT or FET or any device having the same characteristics. In the embodiments of the present disclosure, other than the gate electrode of the transistor, the first electrode of the transistor may be a source or drain electrode, the second electrode of the transistor may be a drain or source electrode. Furthermore, transistors may be divided into N type transistors and P type transistors. In the driving circuit of the embodiments of the present disclosure, all transistors are N type transistors. A person skilled in the art may adopt P type transistors to implement the present disclosure without creative work, which is also falling in to the protection scope of the present disclosure.

Optionally, the driving unit of the touch driving electrode further includes an external control transistor. The gate electrode of the external control transistor receives an external control signal, the first electrode of the external control transistor receives the start signal and the second electrode of the external control transistor is connected to the gate electrode of the input transistor. The potential of the external control signal is the first level.

During practical implementation, the external control signal is used to control the external control transistor to be ON all the time, so as to control the gate electrode of the input transistor to receive the start signal. The external control transistor is always ON so as to filter noise, improve signal quality, efficiently decrease power consumption of noise and transmit signals in a better quality.

Optionally, the second start control node potential control module includes a first control transistor, a second control transistor, a third control transistor and a fourth control transistor. A gate electrode of the first control transistor receives the first level, a first electrode of the first control transistor receives the first clock signal. A gate electrode of the second control transistor is connected to a second electrode of the first control transistor, a first electrode of the second control transistor receives the first level, a second electrode of the second control transistor is connected to the second start control node. A gate electrode of the third control transistor receives the start signal, a first electrode of the third control transistor is connected to the second start control node and a second electrode of the third control transistor receives the second level. A gate electrode of the fourth control transistor is connected to the start control signal output terminal, a first electrode of fourth control transistor is connected to the second start control node and a second electrode of the fourth control transistor receives the second level.

Optionally, the start control signal output module includes a start control signal output transistor, a gate electrode of which is connected to the first start control node, a first electrode of which receives the second clock signal and a second electrode of which is connected to the start control signal output terminal.

Optionally, the driving unit of the touch driving electrode further includes a first single tube transmission gate connected between the second electrode of the input transistor and the first start control node.

The first single tube transmission gate includes a first transmission transistor, a gate electrode of which receives the first level, a first electrode of which is connected to the second electrode of the input transistor, and a second electrode of which is connected to the first start control node.

During practical implementation, the first transmission transistor included in the first single tube transmission gate is always ON so as to filter the noise, improve the signal quality, efficiently decrease the power consumption of noise and transmit signals in a better quality.

Optionally, the first start control node reset module includes a first start control node reset transistor, a gate electrode of which is connected to the second start control node, a first electrode of which is connected to the first start control node, and a second electrode of which receives the second level.

Optionally, the start control signal reset module includes a start control signal reset transistor, a gate electrode of which is connected to the second start control node, a first electrode of which is connected to the start control signal output terminal, and a second electrode of which receives the second level.

Optionally, the driving unit of the touch driving electrode further includes a second capacitor, one end of which is connected to the second start control node and the other end of which receives the second level. During practical implementation, the functionally of the second capacitor is filtering and stabling.

Optionally, the touch driving signal output module includes a touch driving signal output transistor, a gate electrode of which is connected to the first touch node, a first electrode of which receives the touch scanning signal, and a second electrode of which is connected to the touch driving signal output terminal.

The first touch node control module includes a first touch node control transistor, a gate electrode of which is connected to the start control signal output terminal, a first electrode of which is connected to the touch control signal, and a second electrode of which is connected to the first touch node.

The driving unit of the touch driving electrode further includes a third capacitor connected between the gate electrode of the touch driving signal output transistor and the touch driving signal output terminal. During practical implementation, the functionality of the third capacitor is filtering and stabling.

Optionally, the driving circuit of the touch driving electrode further includes a second single tube transmission gate connected between the second end of the first touch node control transistor and the first touch node.

The second single tube transmission gate includes a second transmission transistor, a gate electrode of which receives the first level, a first electrode of which is connected to the first touch transistor, and a second electrode of which is connected to the second electrode of the first control node control transistor.

During practical implementation, the second transmission transistor included in the second single tube transmission gate is always ON so as to filter the noise, improve the signal quality, efficiently decrease the power consumption of noise and transmit signals in a better quality.

Optionally, the second touch node control module includes a fifth control transistor and a sixth control transistor. A gate electrode of the fifth control transistor receives the first level, a first electrode thereof receives the first level, and a second electrode thereof is connected to the second touch node. A gate electrode of the sixth transistor is connected to the second electrode of the first touch node control transistor, a first electrode thereof is connected to the second touch node and the second electrode thereof receives the second level.

Optionally, the driving circuit of the touch driving electrode further includes a third single tube transmission gate connected between the second end of the first touch node control transistor and the gate electrode of the sixth control transistor.

The third single tube transmission gate includes a third transmission transistor, a gate electrode of which receives the first level, a first electrode of which is connected to the second electrode of the first touch node control transistor, and a second electrode of which is connected to the gate electrode of the sixth control transistor.

During practical implementation, the third transmission transistor included in the third single tube transmission gate is always ON so as to filter the noise, improve the signal quality, efficiently decrease the power consumption of noise and transmit signals in a better quality.

Optionally, the touch driving signal reset module further includes a touch driving signal reset transistor, a gate electrode of which is connected to the second touch node, a first electrode thereof is connected to the touch driving signal output terminal, a second electrode of which is connected to the common electrode voltage signal.

Optionally, the driving unit of the touch driving electrode further includes a fourth single tube transmission gate connected between the first electrode of the sixth control transistor and the gate electrode of the touch driving signal reset transistor.

The fourth single tube transmission gate includes a fourth transmission transistor, a gate electrode of which receives the first level, a first electrode of which is connected to the second touch node, and a second electrode of which is connected to the first electrode of the sixth control transistor.

During practical implementation, the fourth transmission transistor included in the fourth single tube transmission gate is always ON so as to filter the noise, improve the signal quality, efficiently decrease the power consumption of noise and transmit signals in a better quality.

Optionally, the driving unit of the touch driving electrode further includes a fourth capacitor, one end of which is connected to the gate electrode of the touch driving signal reset transistor and the other end of which receives the second level. During practical implementation, the functionally of the fourth capacitor is filtering and stabling.

Optionally, the touch node potential control module includes a seventh transistor and an eighth transistor. A gate electrode of the seventh transistor receives the first level, a first electrode thereof receives the first clock signal. A gate electrode of the eighth transistor is connected to the second electrode of the seventh control transistor, a first electrode thereof receives the first level, and a second electrode thereof is connected to the second touch node.

Optionally, the input transistor, the start control signal input transistor, the first start control node reset transistor, the start control signal reset transistor, the touch driving signal output transistor, the first touch node control transistor, the touch driving signal reset transistor, the first control transistor, the second control transistor, the third control transistor, the fourth control transistor, the fifth control transistor, the sixth control transistor, the seventh control transistor, and the eighth control transistor are all NMOS transistors.

During practical implementation, all transistors adopted in the driving unit of the touch driving electrode according to the embodiments of the present disclosure are all NMOS transistors, so as to match better with the existing NMOS display and decrease cost. When the above transistors are all NMOS transistors, the first level V1 is a high level and the second level V2 is a low level.

The driving unit of the touch driving electrode according to an embodiment of the present disclosure is described as follows.

Figure 7:
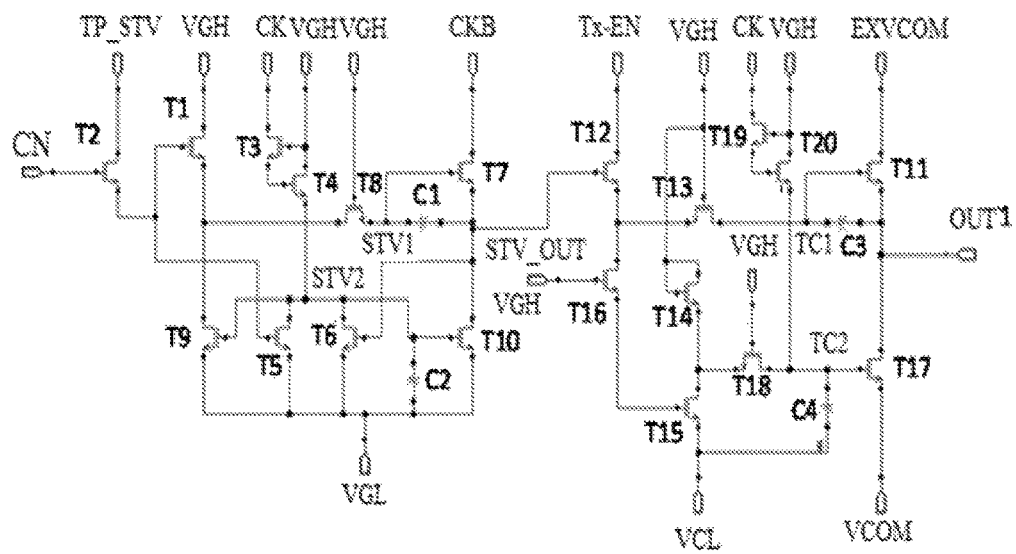
FIG. 7 is a specific circuit diagram showing a driving unit of the touch driving electrode according to some embodiments of the present disclosure.

FIG. 7 is a circuit diagram of the driving unit of the touch driving electrode according to an embodiment of the present invention. As shown in FIG. 7, the input module includes an input transistor T1, a gate electrode thereof receives the start signal TP_STV, a first electrode thereof receives a high level VGH. The first start control node potential maintenance module includes a first capacitor C1.

The driving unit of the touch driving electrode as shown in FIG. 7 further includes an external control transistor T2, a gate electrode thereof receives an external control signal CN, a first electrode thereof receives the start signal TP_STV, and a second electrode thereof is connected to the gate electrode of the input transistor T1. The external control signal CN is a direct current high level signal, and the potential of CN is VGH.

The second start control node potential control module includes a first control transistor T3, a second control transistor T4, a third control transistor T5 and a fourth control transistor T6. A gate electrode of the first control transistor T3 receives a high level VGH, a first electrode thereof receives a first clock signal CK. A gate electrode of the second control transistor T4 is connected to a second electrode of the first control transistor T3, a first electrode thereof receives the high level VGH, and a second electrode thereof is connected to the second start control node STV2. A gate electrode of the third control transistor T5 is connected to a second electrode of the external control transistor T2, a first electrode thereof is connected to the second start control node STV2 and a second electrode thereof receives a low level VGL. A gate electrode of the fourth control transistor is connected to the start control signal output terminal STV_OUT, a first electrode thereof is connected to the second start control node STV2 and a second electrode thereof receives the low level VGL.

Optionally, the start control signal output module includes a start control signal output transistor T7, a gate electrode thereof is connected to the first start control node STV1, a first electrode of which receives the second clock signal CKB, and a second electrode of which is connected to the start control signal output terminal STV_OUT.

The driving circuit of the touch driving electrode as shown in FIG. 7 further includes a first single tube transmission gate connected between the second electrode of the input transistor T1 and the first start control node STV1. The first single tube transmission gate includes a first transmission transistor T8, a gate electrode of which receives the high level VGH, a first electrode of which is connected to the second electrode of the input transistor T1, and a second electrode of which is connected to the first start control node STV1.

The first start control node reset module includes a first start control node reset transistor T9, a gate electrode of which is connected to the second start control node STV2, a first electrode of which is connected to the first electrode of the first transmission transistor T8, and a second electrode of which receives the low level VGL.

The start control signal reset module includes a start control signal reset transistor T10, a gate electrode of which is connected to the second start control node STV2, a first electrode of which is connected to the start control signal output terminal STV_OUT, and a second electrode of which receives the low level VGL.

The driving circuit of the touch driving electrode as shown in FIG. 7 includes a second capacitor C2, one end of which is connected to the second start control node STV2 and the other end of which receives the low level VGL.

The touch driving signal output module includes a touch driving signal output transistor T11, a gate electrode of which is connected to the first control node TC1, a first electrode of which receives a touch scanning signal input by the touch scanning input terminal EXVCOM, a second electrode of which is connected to the touch driving signal output terminal OUT1.

The first touch node control module includes a first control node control transistor T12, a gate electrode of which is connected to the start control signal output terminal STV_OUT, a first electrode of which receives the touch control signal input by the touch signal input terminal Tx_EN, a second electrode of which is connected to the first touch node TC1.

The driving unit of the touch driving electrode as shown in FIG. 7 includes a third capacitor C3 connected between the gate electrode of the touch driving signal output transistor T11 and the touch driving signal output terminal OUT1.

The driving unit of the touch driving electrode as shown in FIG. 7 includes a second single tube transmission gate connected between the second electrode of the first touch node control transistor T12 and the first control node TC1. The second single tube transmission gate includes a second transmission transistor T13, a gate electrode of which receives the high level VGH, a first electrode of which is connected to the first touch node TC1, and a second electrode of which is connected to the second electrode of the first control node control transistor T12.

The second touch node control module includes a fifth control transistor T14 and a sixth control transistor T15. A gate electrode of the fifth control transistor T14 receives the high level VGH, a first electrode of which receives the high level VGH. A first electrode of the sixth control transistor T15 is connected to a second electrode of the fifth control transistor T14, and a second electrode of which receives the low level VGL.

The driving unit of the touch driving electrode as shown in FIG. 7 further includes a third single tube transmission gate connected between the second electrode of the first touch node control transistor T12 and the second electrode of the sixth control transistor T15. The third single tube transmission gate includes a third transmission transistor T16, a gate electrode of which receives the high level VGH, a first electrode of which is connected to the second electrode of the first touch node control transistor T12, and a second electrode of which is connected to the gate electrode of the sixth control transistor T15.

The touch driving signal reset module includes a touch driving signal reset transistor T17, a gate electrode of which is connected to the second touch node TC2, a first electrode of which is connected to the touch driving signal output terminal OUT, and a second electrode of which receives the common electrode voltage signal VCOM.

The driving unit of the touch driving electrode as shown in FIG. 7 further includes a fourth single tube transmission gate connected between the first electrode of the sixth control transistor T15 and the gate electrode of the touch driving signal reset transistor T17. The fourth single tube transmission gate includes a fourth transmission transistor T18, a gate electrode of which receives the high level VGH, a first electrode of which is connected to the second touch node TC2, and a second electrode of which is connected to the first electrode of the sixth control transistor T15.

The driving unit of the touch driving electrode as shown in FIG. 7 further includes a fourth capacitor C4, one end of which is connected to the gate electrode of the touch driving signal reset transistor T17, and the other end of which receives the low level VGL.

The touch node potential control modules includes a seventh control transistor T19 and an eighth control transistor T20. A gate electrode of the seventh control transistor receives the high level VGH, a first electrode of which receives the first clock signal CK. A gate electrode of the eighth control transistor T20 is connected to the second electrode of the seventh control transistor T19, a first electrode of the eighth control transistor T20 receives the high level VGH and a second electrode of the eighth control transistor T20 is connected to the second touch node TC2.

In the driving unit of the touch driving electrode as shown in FIG. 7, T2, T3, T8, T13, T16, T18 and T19 are NMOS transistors which are always in an ON state, so as to filter noise, improve signal accuracy, decrease power consumption of noise and transmit signals in a better quality. During practice, These transistors being always ON may be eliminated from the circuit. T1 to T20 are all NMOS transistors so as to match with the existing NMOS display in a better way and decrease manufacturing cost.

The driving unit of the touch driving electrode as shown in FIG. 7 is a first stage of driving unit in the whole driving circuit of the touch driving electrode. TP_STV of the first stage of driving unit is a narrow pulse signal input by an external controller, TP_STV of a current stage of driving unit is the start control signal output from STV_OUT of an adjacent previous stage of driving unit. Tx_EN is a square wave pulse signal used to select the touch scanning signal input by EXVCOM. The pulse width of the TX_EN signal may be a sum of widths of multiple touch scanning signals input by EXVCOM. The touch scanning signals input by EXVCOM may be a group of high frequency pulse signals for detecting scanning touch signals.

In the driving unit of the touch driving electrode as shown in FIG. 7, T14 functions as a diode, is always in an ON state and works as power supply. T15 has a large size, is used to increase voltage dividing so as to pull down the voltage on the gate electrode of T17 in a better way and turn off T17, so that a phase inversion function is implemented. T11 and T17 work as transmission gate circuit to selectively output one of the touch scanning signal input by EXVCOM and VCOM. T17 has a small size.

Figure 8:
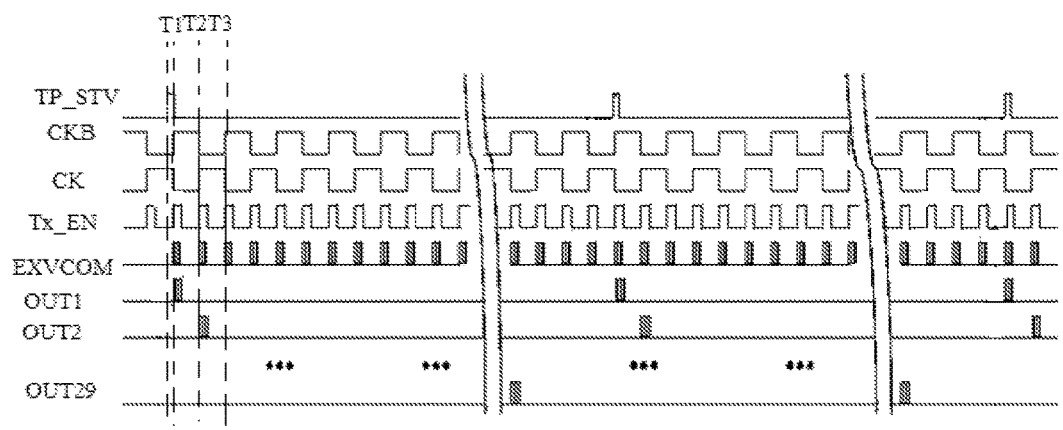
FIG. 8 is a work time sequence diagram of a driving unit of the touch driving electrode according to some embodiments of the present disclosure.

As shown in FIG. 8, when the driving unit of the touch driving electrode as shown in FIG. 7 works, at the first stage T1, TP_STV is at a high level, CK is at a high level and CKB is at a low level. T1 is turned on, T5 is turned on and the potential of STV is pulled down to VGL. C1 is charged by VGH via T1 and T8 which both are the ON state so as to control the potential of STV1 to be bootstrapped to a high level, so that T7 is turned on and CKB receives STV_OUT. At a second stage T2, TP_STV is at a low level, CK is at a low level, CKB is at a high level. The potential of STV1 is maintained to be VGH by C1, T7 is still in an ON state. Since CKB is at a high level at this time, STV_OUT outputs a high level, so that T6 is turned on and the potential of STV2 is maintained at VGL. Since the potential of STV_OUT is VGH, T12 is turned on. When Tx_EN inputs a high level, the potential of TC1 is a high level, T11 is turned on, so that the touch scanning signal input by EXVCOM is output to OUT1, T15 is turned on, the potential of TC2 is a low level and T17 is turned off. When Tx_EN inputs a low level, the potential of TC1 is pulled down and T11 is turned off. T15 is also turned off at this time, so that the potential of TC2 is pulled up to the high level VGH by T18 and T14 which are both turned on. T17 is turned on so that VCOM receives OUT1. At a third stage T3, TP_STV is at a low level, CK is at a high level, CKB is at a low level. When CK is at a high level, T4 is turned on, the potential of STV2 is pulled up to the high level VGH, T10 is turned on, the potential of STV_OUT is pulled down to the low level VGL, T12 is turned off, the potential of TC2 cannot be pulled down, so that the potential of TC2 is always be kept on the high level VGH, T17 is always turned on, VCOM receives OUT1. Since the potential of STV1 cannot be pulled up again during a time period from the end of the third phase T3 to the potential of TP_STV is at a high level again, the level of STV_OUT is always be kept to the low level VGL, OUT1 always outputs VCOM.

As shown in FIG. 8, OUT2 and OUT29 indicates a driving signal output terminal of a driving unit of the second stage of touch driving electrode and a driving signal output terminal of a driving unit of the twenty-ninth stage of touch driving electrode. During practical operation, a first clock signal of a driving unit of a current stage of touch driving electrode is opposite to a first clock signal of a driving unit of an adjacent stage of touch driving electrode. A second clock signal of a driving unit of a current stage of touch driving electrode is opposite to a second clock signal of a driving unit of an adjacent stage of touch driving electrode.

A driving method of the touch driving electrode is used to drive the driving unit of the touch driving electrode. The driving method includes: during a clock period which is right after a preset clock period during which the potential of the start signal is at a first level, the touch driving signal output sub-unit controlling the touch driving signal output terminal to output the touch scanning signal, under the control of the start signal, the first level, the second level, the first clock signal and the second clock signal, when the potential of the start control signal and the potential of the touch control signal are both at the first level; and during a clock period which is right after a preset clock period during which the potential of the start signal is at a first level, under the control of the start signal, the first level, the second level, the first clock signal and the second clock signal, the start signal shift sub-unit controlling the start control signal output terminal to output the first level, then resetting the start control signal to control the start control signal output terminal to output the second level.

A driving circuit of the touch driving electrode according to an embodiment of the present disclosure includes multiple stages of driving units of the touch driving electrode. Except for the first stage of driving unit, a start signal input terminal of each stage of driving unit is connected to the start control signal output terminal of a previous stage of the driving unit.

A touch display panel according to an embodiment of the present disclosure includes the above driving circuit.

The above are merely the preferred embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A driving unit of a touch driving electrode, comprising:
a start signal shift circuit, connected to a start control signal output terminal, and configured to control the start control signal output terminal to output a first level under the control of a start signal, the first level, a second level, a first clock signal and a second clock signal during an adjacent time period next to a time period in which a potential of the start signal is the first level, then reset a start control signal from the start control signal output terminal so as to control the start control signal output terminal to output the second level; and
a touch driving signal output circuit, connected to a touch driving signal output terminal, a touch control signal input terminal, a touch scanning input terminal and the start control signal output terminal, and configured to control the touch driving signal output terminal to output a touch scanning signal under the control of the start control signal when a potential of the start control signal and a potential of a touch control signal from the touch control signal output terminal are both the first level,
wherein a phase of the first clock signal is opposite to that of the second clock signal, wherein the touch driving signal output circuit is further configured to control the touch driving signal output terminal to output a common electrode voltage signal under the control of the start control signal, the first level, the second level, and the first clock signal when the potential of the start control signal and the potential of the touch control signal are not the first level at the same time, wherein the touch driving signal output circuit includes:
a first touch node control circuit, connected to the start control signal output terminal and the first touch node, and configured to receive the touch control signal, and control the first touch node to receive the touch control signal when the start control signal output terminal outputs the first level, and a touch driving signal output circuit, connected to the first touch node and the touch driving signal output terminal, configured to receive the touch scanning signal, and control the touch driving signal output terminal to output the touch scanning signal when the potential of the first touch node is the first level, wherein the touch driving signal output circuit further includes:
a second touch node control circuit, configured to receive the touch control signal, the first level, and the second level, and be connected to the second touch node, control the second touch node to receive the second level when the potential of the touch control signal is the first level, and control the second touch node to receive the first level when the potential of the touch control signal is not the first level, and a touch driving signal reset circuit, connected to the second touch node and the touch driving signal output terminal, and configured to receive the common electrode voltage signal, and control the touch driving signal output terminal to output the common electrode voltage signal when the potential of the second touch node is the first level, and wherein the touch driving signal output circuit further includes a touch node potential control circuit, configured to receive the first clock signal and the first level respectively, connected to the second touch node, and control the second touch node to receive the first level when the potential of the first clock signal is the first level.

2. The driving unit of the touch driving electrode according to claim 1, wherein the start signal shift circuit comprises:
an input circuit, connected to a first start control node, and configured to receive the first level and the start signal, and control the first level to be input to the first start control node when the potential of the start signal is the first level;

a first start control node potential maintenance circuit, connected between the first start control node and the start control signal output terminal, and configured to keep the potential of first start control node to be the first level during the adjacent time period next to the time period in which the potential of the start signal is the first level;

a second start control node potential control circuit, configured to receive the start signal, the first clock signal, the first level and the second level respectively, and connected to a second start control node and the start control signal output terminal, and configured to control the potential of the second start control node to be the first level when the potential of the first clock signal is the first level and control the potential of the second start control node to be the second level when the potential of the start signal is the first level or the start control signal output terminal outputs the first level;

a start control signal output circuit, connected to the first start control node and the start control signal output terminal, configured to receive the second clock signal, and control the start control signal output terminal to output the second clock signal when the potential of the first start control node is the first level;

a first start control node reset circuit, connected to the first start control node and the second start control node, configured to receive the second level, and control the potential of the first start control node to be the second level when the potential of the second start control node is the first level; and a start control signal reset circuit, connected to the second start control node and the start control signal output terminal, configured to receive the second level, and control the start control signal output terminal to output the second level when the potential of the second start control node is the first level.

3. The driving unit of the touch driving electrode according to claim 1, wherein:
the touch driving signal output circuit includes a touch driving signal output transistor, a gate electrode of which being connected to the first touch node, a first electrode of which receiving the touch scanning signal, and a second electrode of which being connected to the touch driving signal output terminal; and the first touch node control circuit includes a first touch node control transistor, a gate electrode of which being connected to the start control signal output terminal, a first electrode of which being connected to the touch control signal, and a second electrode of which being connected to the first touch node.

4. The driving unit of the touch driving electrode according to claim 3, further comprising a third capacitor connected between the gate electrode of the touch driving signal output transistor and the touch driving signal output terminal.

5. The driving unit of the touch driving electrode according to claim 3, further comprising a second single tube transmission gate connected between a second end of the first touch node control transistor and the first touch node, wherein the second single tube transmission gate includes a second transmission transistor, a gate electrode of which receives the first level, a first electrode of which is connected to the first touch transistor, and a second electrode of which is connected to the second electrode of the first control node control transistor.

6. The driving unit of the touch driving electrode according to claim 3, wherein the second touch node control circuit comprises:
a fifth control transistor, a gate electrode of the fifth control transistor receiving the first level, a first electrode thereof receiving the first level, and a second electrode thereof being connected to the second touch node; and a sixth control transistor, a gate electrode of the sixth transistor being connected to the second electrode of the first touch node control transistor, a first electrode thereof being connected to the second touch node and the second electrode thereof receiving the second level.

7. The driving unit of the touch driving electrode according to claim 6, further comprising a third single tube transmission gate connected between a second end of the first touch node control transistor and the gate electrode of the sixth control transistor, wherein the third single tube transmission gate includes a third transmission transistor, a gate electrode of which receives the first level, a first electrode of which is connected to the second electrode of the first touch node control transistor, and a second electrode of which is connected to the gate electrode of the sixth control transistor.

8. The driving unit of the touch driving electrode according to claim 6, wherein:

the touch driving signal reset circuit includes a touch driving signal reset transistor, a gate electrode of which is connected to the second touch node, a first electrode thereof is connected to the touch driving signal output terminal, a second electrode of which is connected to the common electrode voltage signal, the driving unit of the touch driving electrode further includes a fourth single tube transmission gate connected between the first electrode of the sixth control transistor and the gate electrode of the touch driving signal reset transistor, the fourth single tube transmission gate includes a fourth transmission transistor, a gate electrode of which receives the first level, a first electrode of which is connected to the second touch node, and a second electrode of which is connected to the first electrode of the sixth control transistor.

9. The driving unit of the touch driving electrode according to claim 8, further comprising a fourth capacitor, one end of which being connected to the gate electrode of the touch driving signal reset transistor and the other end of which receiving the second level.

10. The driving unit of the touch driving electrode according to claim 8, wherein the touch node potential control circuit comprises:

a seventh control transistor, a gate electrode of the seventh control transistor receiving the first level, a first electrode thereof receiving the first clock signal; and an eighth control transistor, a gate electrode of the eighth control transistor being connected to the second electrode of the seventh control transistor, a first electrode thereof receives the first level, and a second electrode thereof is connected to the second touch node.

11. A driving method of a touch driving electrode, used to drive a driving unit of the touch driving electrode according to claim 1, the driving method comprises:

during a clock period which is right after a preset clock period during which a potential of a start signal is at a first level, a touch driving signal output circuit controlling a touch driving signal output terminal to output a touch scanning signal, under the control of a start signal, the first level, a second level, a first clock signal and a second clock signal, when the potential of the start control signal and the potential of the touch control signal are both at the first level; and during the clock period which is right after the preset clock period during which the potential of the start signal is at a first level, under the control of the start signal, the first level, the second level, the first clock signal and the second clock signal, the start signal shift circuit controlling the start control signal output terminal to output the first level, then resetting the start control signal to control the start control signal output terminal to output the second level.

12. A driving circuit of a touch driving electrode, comprising multiple stages of driving units of the touch driving electrode according to claim 1, wherein:

except for a first stage of driving unit, a start signal input terminal of each stage of driving unit is connected to the start control signal output terminal of a previous stage of the driving unit;

first clock signals applied to adjacent stages of driving units have opposite phase; and second clock signals applied on adjacent stages of driving units have opposite phase.

13. A driving unit of a touch driving electrode, comprising:

a start signal shift circuit, connected to a start control signal output terminal, and configured to control the start control signal output terminal to output a first level under the control of a start signal, the first level, a second level, a first clock signal and a second clock signal during an adjacent time period next to a time period in which a potential of the start signal is the first level, then reset a start control signal from the start control signal output terminal so as to control the start control signal output terminal to output the second level; and a touch driving signal output circuit, connected to a touch driving signal output terminal, a touch control signal input terminal, a touch scanning input terminal and the start control signal output terminal, and configured to control the touch driving signal output terminal to output a touch scanning signal under the control of the start control signal when a potential of the start control signal and a potential of a touch control signal from the touch control signal input terminal are both the first level, wherein a phase of the first clock signal is opposite to that of the second clock signal, and wherein the start signal shift circuit comprises:

an input circuit, connected to a first start control node, and configured to receive the first level and the start signal, and control the first level to be input to the first start control node when the potential of the start signal is the first level, a first start control node potential maintenance circuit, connected between the first start control node and the start control signal output terminal, and configured to keep the potential of first start control node to be the first level during the adjacent time period next to the time period in which the potential of the start signal is the first level, a second start control node potential control circuit, configured to receive the start signal, the first clock signal, the first level and the second level respectively, and connected to the second start control node and the start control signal output terminal, and configured to control the potential of the second start control node to be the first level when the potential of the first clock signal is the first level and control the potential of the second start control node to be the second level when the potential of the start signal is the first level or the start control signal output terminal outputs the first level, a start control signal output circuit, connected to the first start control node and the start control signal output terminal, configured to receive the second clock signal, and control the start control signal output terminal to output the second clock signal when the potential of the first start control node is the first level, a first start control node reset circuit, connected to the first start control node and the second start control node, configured to receive the second level, and control the potential of the first start control node to be the second level when the potential of the second start control node is the first level, and a start control signal reset circuit, connected to the second start control node and the start control signal output terminal, configured to receive the second level, and control the start control signal output terminal to output the second level when the potential of the second start control node is the first level.

14. The driving unit of the touch driving electrode according to claim 13, wherein:

the input circuit comprises an input transistor, a gate electrode of the input transistor receiving the start signal, a first electrode of the input transistor receiving the first level, and a second electrode of the input transistor being connected to the first start control node, the first start control node potential maintenance circuit includes a first capacitor, the driving unit of the touch driving electrode further includes an external control transistor, a gate electrode of the external control transistor receiving an external control signal, a first electrode of the external control transistor receiving the start signal and a second electrode of the external control transistor being connected to the gate electrode of the input transistor, a potential of the external control signal is the first level, and the second start control node potential control circuit comprises:

a first control transistor, a gate electrode of the first control transistor receiving the first level, a first electrode of the first control transistor receiving the first clock signal, a second control transistor, a gate electrode of the second control transistor being connected to a second electrode of the first control transistor, a first electrode of the second control transistor receiving the first level, a second electrode of the second control transistor being connected to the second start control node, a third control transistor, a gate electrode of the third control transistor receiving the start signal, a first electrode of the third control transistor being connected to the second start control node and a second electrode of the third control transistor receiving the second level, and a fourth control transistor, a gate electrode of the fourth control transistor being connected to the start control signal output terminal, a first electrode of fourth control transistor being connected to the second start control node and a second electrode of the fourth control transistor receiving the second level.

15. The driving unit of the touch driving electrode according to claim 14, wherein the start control signal output circuit comprises a start control signal output transistor, a gate electrode thereof is connected to the first start control node, a first electrode thereof receives the second clock signal, and a second electrode thereof is connected to the start control signal output terminal.

16. The driving unit of the touch driving electrode according to claim 15, further comprising a first single tube transmission gate connected between the second electrode of the input transistor and the first start control node, wherein the first single tube transmission gate includes a first transmission transistor, a gate electrode of which receives the first level, a first electrode of which is connected to the second electrode of the input transistor, and a second electrode of which is connected to the first start control node.

17. The driving unit of the touch driving electrode according to claim 15, wherein:

the first start control node reset circuit comprises a first start control node reset transistor, a gate electrode of which is connected to the second start control node, a first electrode of which is connected to the first start control node, and a second electrode of which receives the second level, and the start control signal reset circuit comprises a start control signal reset transistor, a gate electrode of which is connected to the second start control node, a first electrode of which is connected to the start control signal output terminal, and a second electrode of which receives the second level.

18. The driving unit of the touch driving electrode according to claim 17, further comprising a second capacitor, one end of which being connected to the second start control node and the other end of which receiving the second level.

* * * * *